United States Patent
Gomez

(10) Patent No.: US 7,326,329 B2
(45) Date of Patent: *Feb. 5, 2008

(54) COMMERCIAL PRODUCTION OF HYDROGEN FROM WATER

(75) Inventor: Rodolfo Antonio M. Gomez, 248 Flinders Street, Adelaide, 5000 South Australia (AU)

(73) Assignee: Rodolfo Antonio M. Gomez, South Australia (AU)

( * ) Notice: Subject to any disclaimer, the term of this patent is extended or adjusted under 35 U.S.C. 154(b) by 476 days.

This patent is subject to a terminal disclaimer.

(21) Appl. No.: 11/008,780

(22) Filed: Dec. 9, 2004

(65) Prior Publication Data

US 2005/0126924 A1    Jun. 16, 2005

(30) Foreign Application Priority Data

Dec. 15, 2003    (AU) .............................. 2003906872

(51) Int. Cl.
*C25B 1/04* (2006.01)

(52) U.S. Cl. ............. 205/630; 205/628; 205/637; 205/638; 204/267; 204/269; 204/275.1; 204/242

(58) Field of Classification Search ............... 205/628, 205/630, 637, 638; 204/267, 269, 275.1, 204/242
See application file for complete search history.

(56) References Cited

U.S. PATENT DOCUMENTS

| 4,279,710 A | * | 7/1981 | Coughlin | 205/343 |
| 5,824,200 A | * | 10/1998 | Kitajima et al. | 204/265 |
| 5,882,502 A | * | 3/1999 | Gomez | 205/568 |
| 7,182,851 B2 | * | 2/2007 | Gomez | 205/637 |
| 2002/0058174 A1 | * | 5/2002 | Gomez | 429/31 |
| 2005/0072665 A1 | * | 4/2005 | Gomez | 204/232 |

OTHER PUBLICATIONS

D.H. Smith, Industrial Water Electrolysis, Chapter 4, Elsevier Publishing Company.

* cited by examiner

*Primary Examiner*—Bruce F. Bell
(74) *Attorney, Agent, or Firm*—Klauber & Jackson L.L.C.

(57) ABSTRACT

Large quantities of low cost hydrogen free of carbon oxides are required as fuel for the hydrogen economy. Commercial quantities of hydrogen can be produced from the electrolysis of water using a diaphragm-less electrolytic cell. The electrolytic cell has an anode cell (31) and a cathode cell (32) connected by a DC power source (53) and an external conductor (52). An alternate apparatus method to produce hydrogen is to electrolyze water using unipolar activation. Unipolar activation uses separate anode and cathode circuits and can use secondary cathode (132) and anode (139) cells to recover energy and produce further hydrogen.

35 Claims, 6 Drawing Sheets

COMMERCIAL PRODUCTION OF HYDROGEN FROM WATER

RELATED APPLICATIONS

The present application claims priority from Australian Patent Application Serial No. 2003906872 filed on Dec. 15, 2003. Applicant claims priority under 35 U.S.C. §119 as to said application, and the entire disclosure of that application is incorporated herein by reference.

FIELD OF INVENTION

This invention covers the production of commercial quantities of hydrogen from the electrolysis of water.

PRIOR ART

The production of hydrogen and oxygen by electrolysis of water in diaphragm cells has been carried out to produce limited commercial quantities of hydrogen and oxygen. Development of the gasification process for fossil fuels using the water gas and the shift converter reactions produced hydrogen at substantially lower cost that was suitable for major industrial requirements such as in ammonia manufacture and hydrogen for oil refining processes. The emerging interest in the technical requirement for hydrogen without carbon oxides for use in Proton Electrolytic Membrane (PEM) fuel cells in transport vehicles has focused interest in producing carbon free hydrogen from gasification gas. One such project is filtering the gasification gas in ceramic filters in one of the projects of the US Department of Energy. The need for carbon oxide-free hydrogen has revived interest in the electrolysis of water for hydrogen production.

The electrolysis of water using diaphragm cells to produce hydrogen and oxygen is a well known art. FIG. 1 shows a diagram of the best method of operating a conventional diaphragm cell for water electrolysis. The ionic circuit is substantially improved by transferring the anolyte from the anode cells to the cathode cells. The diaphragm remains a major problem in water electrolysis because it increases impedance and makes it difficult to agitate the electrolyte to reduce over-voltage. While it must allow electrons to pass through with the least resistance, the diaphragm must not allow mixing of the oxygen produced at the anode with the hydrogen produced at the cathode.

The electrolysis of water using diaphragm cells to produce hydrogen and oxygen is a commercial process with the Knowles and the Stuart cells well established.

The commercial methods utilize the diaphragm cell with one electrolyte, usually a 28 to 30 weight percent potassium hydroxide solution. The cells are pressurized up to around 40 bars and the cell operating temperature is up to 150 degrees Celsius. Various configurations of the diaphragm cell are used and different coatings on the electrode surface are applied to reduce the impedance of the cells. The efficiency performance and operating conditions of two of the commercial units reported in the mid-1980s are:

The Knowles Cell (The International Electrolytic Plant Co. Ltd.):

| | |
|---|---|
| Hydrogen Produced per unit cell, $Nm^3/hr.$ | 2.06 |
| Current, amperes | 4,500 |
| Voltage, volts | 1.9 |
| Electrolyte, w/v % aqueous KOH | 28 |
| Temperature, C. | 80 |
| Gas Purities Hydrogen, % v/v | 99.75 |
| Oxygen, % v/v | 99.5 |
| Power Consumption, kwh per $Nm^3$ Hydrogen | 4.14 |

The Stuart Cell (Efco-Royce Furnaces Ltd.):

| | |
|---|---|
| Hydrogen Produced per unit cell, $Nm^3/hr.$ | 2.4 |
| Current, amperes | 5,250 |
| Voltage, volts | 2.04 |
| Electrolyte, w/v % aqueous KOH | 28 |
| Temperature, C. | 85 |
| Gas Purities Hydrogen, % v/v | 99.9 |
| Oxygen, % v/v | 99.7 |
| Power Consumption, kwh per $Nm^3$ Hydrogen | 4.9 |

In these examples, the Knowles cell has an energy efficiency of about 65 percent while the Stuart cell has an energy efficiency of about 55 percent, excluding energy used for pumping and heating. The conventional diaphragm cells used by the Knowles and Stuart electrolytic cells in water electrolysis result in low energy efficiency and low capacity. The capacity of these diaphragm cells is also limited (10.71 Kilowatts for the Stuart Cell and 8.55 kilowatts for the Knowles Cell) and will not meet the high volume demand for electrolytic hydrogen for fuel cells in transport vehicles. Efficiencies and capacities may have improved in current models of these diaphragm type electrolytic cells as the data above is from the mid-eighties.

Further information on industrial water electrolysis is provided in "Industrial Electrochemical Processes" A. T. Kuhn, Chapter 4, D. H. Smith p. 127, Elsevier Publishing Company.

D. H. Smith discusses why more energy is required than the theoretical to effect the electrolysis of water. "The theoretical decomposition voltage of water is 1.229 volts. Additional energy is required to produce gaseous hydrogen and oxygen at the electrode surface and to overcome depletion of hydrogen and oxygen ions at the electrode surface as the reaction proceeds. This phenomenon is known as the over-voltage at the electrode. Additional energy is required to overcome the electrical resistance between the anode and cathode electrodes. This is a function of the conductivity of the electrolyte, the distance between the electrodes, and the resistance offered by the diaphragm. Commercial water electrolytic diaphragm cells to produce hydrogen and oxygen need to operate between 1.8 to 2.6 volts to overcome all these resistance".

Efforts to increase capacity in the conventional configuration will result in lower efficiency due to the use of the diaphragm cell.

The electrolysis of water to produce hydrogen can only be commercially acceptable if the quality of the hydrogen is suitable for application to proton electrolytic membrane or similar fuel cells if the production rate matches the demand for fuel cell transport vehicles and if the cost of the hydrogen is competitive to hydrocarbon fuels.

A simple, safe and low cost electrolytic process to produce hydrogen from water over a wide range of capacity is required to use electricity produced from solar, wind, hydro, and geothermal energies. The capacity required of the electrolytic process will range from a few kilowatts to several hundred thousand kilowatts.

The object of this invention is to attempt to provide for at least some of these needs or to at least provide a useful alternative.

BRIEF DESCRIPTION OF THE INVENTION

In one form therefor the invention is said to reside in an electrolytic process to produce hydrogen from water, the process comprising the steps of;

passing a first electrolyte through a diaphragm-less anode cell to produce oxygen wherein the anode cell has an anode connected to a DC power source and an anode solution electrode;

passing a second electrolyte through a diaphragm-less cathode cell to produce hydrogen wherein the cathode cell has a cathode connected to the DC power source and a cathode solution electrode;

the anode solution electrode connected to the cathode solution electrode by an external conductor; and applying a DC current from the DC power source to the anode and the cathode.

In one embodiment of the invention the first electrolyte and the second electrolyte are the same electrolyte and the step of supplying the first electrolyte to the anode cell comprises supplying the second electrolyte and the step of supplying the second electrolyte to the anode cell comprises supplying the first electrolyte.

There may be further included the steps of separating hydrogen from the second electrolyte between the cathode cell and the anode cell and separating oxygen from the first electrolyte between the anode cell and the cathode cell. The step of separating hydrogen and oxygen from the second and first electrolytes respectively may comprise the steps of passing the respective electrolytes through an hydrocyclone and a gas liquid separator.

Preferably the electrolyte is water that is acidic or basic and make up water can be added as water or as steam.

The DC current may be applied at a steady rate or the current applied may be pulsed. The pulsed DC current may have a frequency up to several thousand pulses per second and an amplitude up to 100 times the average value of the current.

The pressure in the anode and cathode cells may be up to 100 bars.

Regenerative pumps may be used to minimise the energy required to maintain pressure in the anode and cathode cells.

There may be further included the step of applying microwaves to the electrolytes.

The anode cells and the cathode cells may be operated at a temperature of up to 200 degrees Celsius.

Catalyst ions may be added to the electrolyte to reduce the voltage required to produce the hydrogen and increase the production rate of hydrogen.

The anode solution electrodes and the cathode solution electrodes may be coated with a substance to increase the over-voltage of the undesired reactions of the catalyst ions.

The anode solution electrodes and the cathode solution electrodes may be shrouded with a non-conductor mesh to retain a stagnant layer of electrolyte on the surface of the solution electrodes to avoid undesired reactions of the catalyst ions.

Modifiers such as boric acid may be added to the electrolyte to maintain a good quality and consistency of the electrolyte. Modifiers such as surfactants may also added to the electrolyte to make the surface of the anode and cathode electrodes aerophobic to minimize the formation of gas bubbles on the electrode surfaces.

The various electrode surface areas may be increased by grooving, by the use of expanded metal sheets and creating pyramids on the electrode surface. The anode and the cathode surfaces may also be coated with a substance to reduce the over-voltage of the desired reactions on these electrodes.

In an alternative embodiment the first electrolyte is an alkaline electrolyte and the electrolytic process in the anode cell to produce oxygen is carried out in an anode circuit and the second electrolyte is an acidic electrolyte and the electrolytic process in the cathode cell to produce hydrogen is carried out in a cathode circuit and the anode circuit and the cathode circuit are kept separate except for the electrical connections.

The anode circuit may further include a secondary cathode cell and the cathode circuit may further include a secondary anode cell, the secondary anode cell having a secondary anode and a secondary anode solution electrode, the secondary cathode cell having a secondary cathode and a secondary cathode solution electrode, the secondary cathode and the secondary anode are connected by an external conductor, and the secondary cathode solution electrode and the secondary anode solution electrode are connected by an external conductor, the first electrolyte being passed from the anode cell to the secondary cathode cell to produce hydrogen therein before being recycled to the anode cell and the second electrolyte being passed from the cathode cell to the secondary anode cell to produce oxygen therein before being recycled to the cathode cell.

There may be further included the steps of separating oxygen from the first electrolyte before transferring it to the secondary cathode call and separating hydrogen after the secondary cathode cell before being recycled to the anode cell and separating hydrogen from the second electrolyte before transferring it to the secondary anode call and separating oxygen after the secondary anode cell before being recycled to the cathode cell.

In an alternative form the invention is said to reside in an electrolytic apparatus to produce hydrogen from water, the apparatus comprising a diaphragm-less anode cell to produce oxygen wherein the anode cell has an anode connected to a DC power source and an anode solution electrode, a diaphragm-less cathode cell to produce hydrogen wherein the cathode cell has a cathode connected to the DC power source and a cathode solution electrode, the anode solution electrode connected to the cathode solution electrode by an external conductor, means to supply a first electrolyte to the anode cell, means to supply a second electrolyte to the anode cell and means to apply a DC current from the DC power source to the anode and the cathode.

In one embodiment the first electrolyte and the second electrolyte are the same electrolyte and the means to supply the first electrolyte to the anode cell supplies the second electrolyte and the means to supply the second electrolyte to the anode cell supplies the first electrolyte. There may be further included means to separate hydrogen from the second electrolyte between the cathode cell and the anode cell and means to separate oxygen from the first electrolyte between the anode cell and the cathode cell. The means to separate hydrogen and oxygen from the second and first electrolytes respectively may comprise an hydrocyclone and a gas liquid separator.

The means to apply a DC current from the DC power source the DC current may be adapted to supply current at a steady rate or pulsed.

The means to supply the first and second electrolytes may be regenerative pumps to minimise the energy required to maintain pressure in the anode and cathode cells.

There may be further included means to apply microwaves to the electrolytes.

The anode solution electrodes and the cathode solution electrodes may be coated with a substance to increase the over-voltage of the undesired reactions of the catalyst ions. They may be shrouded with a non-conductor mesh to retain a stagnant layer of electrolyte on the surface of the solution electrodes to avoid undesired reactions of the catalyst ions.

The cathode and anode surface area may be increased by grooving, by the use expanded metal sheets and creating pyramids on the electrode surface and their surfaces may be coated with a substance to reduce the over-voltage of the desired reactions on these electrodes.

In an alternative embodiment the anode cell may be in an anode circuit and the cathode cell may be in a cathode circuit and the anode circuit and the cathode circuit are separate, the first electrolyte in the anode circuit comprising an alkaline electrolyte and the second electrolyte in the cathode circuit comprising an acidic electrolyte.

The anode circuit may further include a secondary cathode cell and the cathode circuit may further include a secondary anode cell, the secondary anode cell having a secondary anode and a secondary anode solution electrode, the secondary cathode cell having a secondary cathode and a secondary cathode solution electrode, the secondary cathode and the secondary anode are connected by an external conductor, and the secondary cathode solution electrode and the secondary anode solution electrode are connected by an external conductor, the first electrolyte being passed from the anode cell to the secondary cathode cell to produce hydrogen therein before being recycled to the anode cell and the second electrolyte being passed from the cathode cell to the secondary anode cell to produce oxygen therein before being recycled to the cathode cell.

The electrolytic apparatus may further comprise means to separate oxygen from the first electrolyte before transferring it to the secondary cathode call and means to separate hydrogen after the secondary cathode cell before being recycled to the anode cell and means to separate hydrogen from the second electrolyte before transferring it to the secondary anode call and means to separate oxygen after the secondary anode cell before being recycled to the cathode cell.

Diaphragm-less Electrolytic Process in Conventional Mode

The principle of the application of the cell of the present invention to water electrolysis is shown on FIG. 2. Oxygen 23 is produced at the anode cell 11 while hydrogen 24 is produced at the cathode cell 12. Using a potassium hydroxide electrolyte, the theoretical total cell voltage is 1.229 volts with 0.401 volts at the anode and 0.828 volts at the cathode. If the electrolyte composition, temperature, and electrode area are the same at the anode cell and the cathode cell, the voltages of the anode and cathode cells are proportional to the gaps between the solution electrodes and the anode or cathode electrode. Using the appropriate cell voltage, gaps, temperature, pressure and material on the surfaces of the electrodes will optimize the electrolytic cell efficiency. The other important advantage of the electrolytic cell is that oxygen and hydrogen are produced in separate vessels to avoid the danger of mixing. The electrolytic cell will also have less impedance and deliver high capacity per cell than conventional diaphragm cells.

The direct electric current applied to the anode and cathode electrodes is usually a steady current but a preferred embodiment of this invention is to apply a pulsed direct current to the anode and cathode electrodes. The frequency may range up to several thousand cycles per second and the amplitude may range up to 100 times the average of the direct current. The objective of the pulsed current is to achieve the desire result at a lower energy cost.

Large surface area contact between the electrodes and the electrolyte can be achieved by the construction of the electrode such as a gauze or expanded metal construction where the electrolyte is passed through the electrode.

Adding catalysts and modifiers in the electrolyte would also add to the capacity and means to lower the voltage required in the production of hydrogen by this invention. Catalysts can generally be effective in acid electrolyte. In FIG. 3, the catalytic reaction at the anode cell 31 using ferric ions in a phosphoric acid electrolyte may be described as follows:

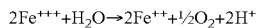
$2Fe^{+++}+H_2O \rightarrow 2Fe^{++}+\frac{1}{2}O_2+2H^+$

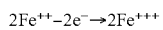
$2Fe^{++}-2e^- \rightarrow 2Fe^{+++}$

To assure high current efficiency when using catalysts that are reversible such as the ferrous-ferric ion example above, the surface of the solution electrode at the anode and the solution electrode at the cathode are covered with non-conductive mesh such as a plastic material, to maintain a stagnant layer of electrolyte on the surface of the solution electrodes. This ensures that the solution electrodes act only as current carriers and do not participate in the anode or cathode cell reactions.

The electrolytic cells have to operate at high pressure, about 40 bars to reduce gas bubbles from reducing the active surface area of the electrodes. High temperature in the cells reduce the resistance of the electrolyte to reduce the cell voltage. This adds cost to the capital and operation of the electrolytic cell. FIG. 3 shows one method of operating the cells at high pressure. The regenerative turbine pumps reduce the power requirement.

This invention includes another embodiment where the regenerative pumps 40 and 51 are replaced by microwave units. The anolyte 39 is passed through a microwave unit and circulated to the anode cell to complete the reaction described above at a temperature below the boiling point of the electrolyte.

The surface of the electrodes may also be plated or covered with a substance that reduces the over-voltage of the electrode.

It is relatively easy and quick to establish the optimum parameters in a large-scale laboratory apparatus as a first step in the commercialization of the electrolytic cell. The parameters include electrode material, area and shape, electrolyte composition including catalysts and modifiers, temperature, and pressure to produce hydrogen at the lowest energy at the highest production rate. A large pilot plant may be suitable to supply commercial quantities of hydrogen for a particular purpose such as supplying hydrogen for cooling of equipment in a large steam turbine power plant, or a unit to supply hydrogen to transport vehicles at a remote location.

Commercial Electrolytic Production of Hydrogen

The commercial production of hydrogen using the electrolytic cell of the present invention is shown on FIG. 3. The electrodes could be of the planar type in a cubical cell container or circular in a cylindrical vessel under pressure. The cells are pressurized and operate near or above the boiling temperature of the electrolyte. Large cells may be provided with mechanical agitators. Anolyte 39 containing the hydrogen ion and oxygen is passed through a turbine 40 to lower the pressure and recover power and then to hydrocyclones 41 to remove more oxygen dissolved in the anolyte. Oxygen recovered may be discharged to atmosphere or delivered to the oxygen storage. The anolyte is then pumped to the cathode cells 32 where hydrogen gas is produced. The catholyte 50 is passed to a turbine 51 to reduce the pressure and recover energy and then to a hydro-cyclone 55 to recover hydrogen dissolved in the catholyte. A discharge vessel may be installed before the hydro-cyclone. The hydrogen produced is cooled and then passed on to the hydrogen storage for use or for sale. Other means of extracting the dissolved hydrogen such as applying vacuum or using a liquid vortex separator may be used. Hydrogen 62 recovered is delivered to the hydrogen storage. Water is added to the catholyte before it is pumped to the anode cells. Water addition may be controlled by a float valve in the anode pump box. Water may also be added to the anode cells as steam for heating.

Heat is required to maintain the cells at the optimum operating temperature of about 100° C. or more. Some of this heat may come from the electrical resistance of the electrolyte but some of the heat must be supplied externally through heating of the electrolyte, heating outside the cells or direct steam injection into the anode and cathode cells.

Projections of commercial production capacity and electrode sizes of the electrolytic cell of the present invention are shown on Table 2. Efficiencies are based on 10% consumed by pumps and heating and an electrolysis voltage of 1.41335 volts. These projections need to be confirmed in pilot plant tests but are indicative of the efficiency and capacity of the electrolytic process to produce hydrogen.

Commercial Production of Hydrogen Using Unipolar Electrolysis

The second major portion of this invention is the production of hydrogen from water using unbalanced electrolysis or unipolar activation as a means to reduce the energy consumption.

According to W. Latimer's electromotive data, hydrogen is produced at a reference voltage of zero at the cathode in an acid circuit while oxygen is produced at a reference voltage of −0.401 volts at the anode in an alkaline circuit. If one electrolyte be it acid or alkaline is passed through the primary anode and primary cathode cells, the theoretical voltage required to produce the hydrogen and oxygen is 1.229 volts.

Based on classical concept, a solution is always in electronic equilibrium except for very minute layers next to an electrode known as the Helmholtz layer. The number of negative ions equal the number of positive ions. This concept was put to the test using an experimental apparatus similar to the diagram in FIG. 4. Separate anode and cathode circuits were set up. The electrodes used are graphite electrodes 50 mm×500 mm×4 mm thick specified as EK72 from National Carbon of the USA. Two electrodes with 3 solution electrodes were used in the anode cell and cathode cell. The gap between the anode and the anode solution electrodes is 2.5 mm and the gap between the cathode and the cathode solution electrodes is also 2.5 mm. The flow diagram in the cathode circuit consisted of a pumping electrolyte to the cathode and the catholyte gravitating to a pump box. A similar flow diagram was used for the anode circuit. The 2 cells were connected electrically by solution electrodes 78 and 79 and an external conductor.

After running the apparatus for water electrolysis, the power source was disconnected and a small electric bulb was connected between the anode and cathode. The bulb lit when the electrolytes were circulated again indicating that the electrolytes developed opposite electric potential and this was discharged by the electrodes. The alkaline electrolyte discharged in about 20 seconds while the acid electrolyte discharged over a longer period. When the apparatus was operated with potassium hydroxide through the anode cell and phosphoric acid through the cathode cell with separate pump boxes, the cell voltage for the same cell current was significantly less than when only potassium hydroxide electrolyte was used. Cell voltages were higher than voltages reported for conventional diaphragm cells probably because the unipolar apparatus experiment was not optimized for water electrolysis.

The objective of these tests is to determine the power required to pass a certain amount of current through the Electrochemical cell at different concentrations. Another objective is to determine if there is a battery effect after electrolysis has been applied to the electrolyte.

The observations are:

Once the impedance of the cell is overcome, the voltage necessary to pass a certain current through the cell is directly proportional to the current.

The acid solution required a higher voltage to pass the same current as the basic solution.

In the acid solution, the more dilute acid required a lower voltage to pass the same amount of current.

In the basic solution, the more dilute solution required a higher voltage to pass the same amount of current through the cell.

After electrolysis, a residual charge was observed of the same polarity as the impressed voltage.

This residual charge was about the same for the acid and the basic electrolytes but the acid electrolyte seem to hold the potential longer than the basic electrolyte.

The residual voltage after electrolysis seem about half the impressed voltage.

The total voltage impressed on the cell is equal to the voltage across the anode-solution electrode plus the voltage across the cathode-solution electrodes less resistance drop between the power source and the cell.

Voltage required could be further optimised by adjusting the gaps of the electrodes at the anode and at the cathode.

It was observed that the carbon electrodes were attacked by both acid and basic electrolytes.

Faraday's law state that one gram-mole of hydrogen is produced in the primary cell for every faraday (96,500 coulombs) passed through the cell. To reduce the energy required to produce one gram-mole of hydrogen, the voltage must be reduced to as low as possible. To reduce the voltage, the impedance of the system must be as low as possible, and so far, the following are the known and projected factors:

The voltage impressed on the primary cells is the sum of the voltage between the anode electrode and the anode solution electrode, and the cathode and the cathode solution electrode.

The over-voltage of the electrode surface material where hydrogen and oxygen are evolving must be as low as possible by using the appropriate electrode surface material and adequate mixing of the electrolyte next to the electrode.

The electrical conductivity of the electrolytes must be as high as possible. Low concentration of the acid and high concentration of the alkaline electrolytes are desirable. Measurements show the electrolyte conductivity increases up to the boiling point of the electrolyte.

Large specific surface area and current density on the surface of the electrodes is important and optimum values need to be established. Logically, large current densities require more potential to achieve. Large current densities are necessary for commercial applications.

The hydrogen and oxygen produced at the surface of the electrodes must be removed as quickly as possible to leave the surface of the electrode available for the electrolytic reaction. This is assisted by operating the cells under pressure and also maintaining turbulence at the surface of the electrodes.

The effect of catalysts and modifiers in the electrolyte must be tested to further improve the performance of the electrolytic cell.

The neutralized electrolytes being circulated to the primary cells would help reduce the voltage required for the primary DC power source.

A concept for unipolar electrolysis was developed for water electrolysis based on the limited experiments described above. This unipolar concept is described in the diagram shown on FIG. 5.

The positive terminal of the DC source 95 is connected to the primary anode electrode and the negative is connected to the primary cathode electrode. The solution electrodes electrically connect the primary alkaline electrolyte to the primary acid electrolyte. At the primary anode cell, the following reaction occurs:

$$2OH^- - 2e^- \rightarrow H_2O + \tfrac{1}{2}O_2$$

The alkaline electrolyte 98 exiting from the primary anode cell has excess hydrogen ions so that this electrolyte is positively charged. At the cathode with the acid electrolyte, the following reaction occurs:

$$2H^+ + 2e^- \rightarrow H_2$$

The acid electrolyte 108 exiting from the primary cathode cell has excess hydroxyl ions so that this electrolyte is negatively charged. When the electrolytes 98 and 108 are passed through a second set of electrolytic cells, the electrolytes are discharged, causing current to flow from the secondary anode cell 110 to the secondary cathode cell 100 through conductor 101. This means oxygen is further produced from the secondary anode cell and hydrogen from the secondary cathode cell. The neutralized electrolytes 96 and 113 are recycled to the respective anode and cathode circuits.

This unipolar concept to produce hydrogen needs to be confirmed in further tests using optimum conditions such as correct electrode material, electrode area, electrode gap, and cell voltage. Accurate instruments are necessary to measure cell voltage, cell current, temperature and pressure, and the amount of oxygen and hydrogen produced. A diagrammatic presentation of the unipolar commercial production of hydrogen is shown on FIG. 6. One separate circuit consists of a set of primary anode cells 120 and another set of secondary cathode cells 132 with an alkaline electrolyte 148 and a separate circuit with an acid electrolyte 149 containing primary cathode cells 126 and secondary anode cells 139. The projected chemical reactions in the potassium hydroxide alkaline circuit are projected to be:

At the anode: $6OH^- - 6e^- \rightarrow \tfrac{3}{2}O_2$

At the cathode: $6K^+ + 6OH^- + 6H^+ + 6e^- \rightarrow 6KOH + 3H_2$

The projected reactions at the phosphoric acid circuit are:

At the cathode: $6H^+ + 6e^- \rightarrow 3H_2$

At the anode: $2PO_4^{---} + 6H^+ + 6OH^- - 6e^- \rightarrow H_3PO_4 + 3H_2O + \tfrac{3}{2}O_2$ Water 147 is the only substance consumed in the process and this is simply made up by adding make-up water via a float valve at the anode pump box and cathode pump box or direct addition of water to the anode and cathode cell as steam. The electrodes may be coated with material that is chemically resistant to the electrolytes such as plating with platinum in the acid circuit. The electrodes may be made of conducting material such as metals, graphite and glassy carbon, conducting plastics and ceramic. Special coatings on the electrodes may be used to reduce the over-voltage. Activators and surfactants may be added to the electrolyte.

For smaller hydrogen requirements, tangential entry cell in electrolyte series or parallel connections may be used. These tangential entry cylindrical cells have the anode or the cathode electrode for the outer cylinder and an inner cylinder is used as the solution electrode.

These type of cells may be suitable for providing hydrogen in strategic locations to provide hydrogen for personal transport vehicles. These cylindrical cells may also suitable for producing hydrogen and oxygen in remote locations using solar cells for electric power.

An immediate application of the electrolytic process of this invention is to use off-peak electricity from thermal, nuclear or hydroelectric power plants to produce hydrogen transport fuel cheaper than petroleum fuels such as gasoline or auto-diesel. The water electrolytic system of this invention can be designed to be started and shut-down on demand in stages. As an example shown on Table 1, hydrogen produced for 12 hours by a 114MW off-peak power can supply hydrogen to 3,180 fuel cell cars powered by 75 kw fuel cells operating for 5 hours or 271 buses powered by 250 kw fuel cells operating for 22 hours.

BRIEF DESCRIPTION OF THE DRAWINGS

This then generally describes the invention but to assist with understanding reference will now be made to the accompanying drawings in which.

DESCRIPTION OF PREFERRED EMBODIMENTS

Figure 1:
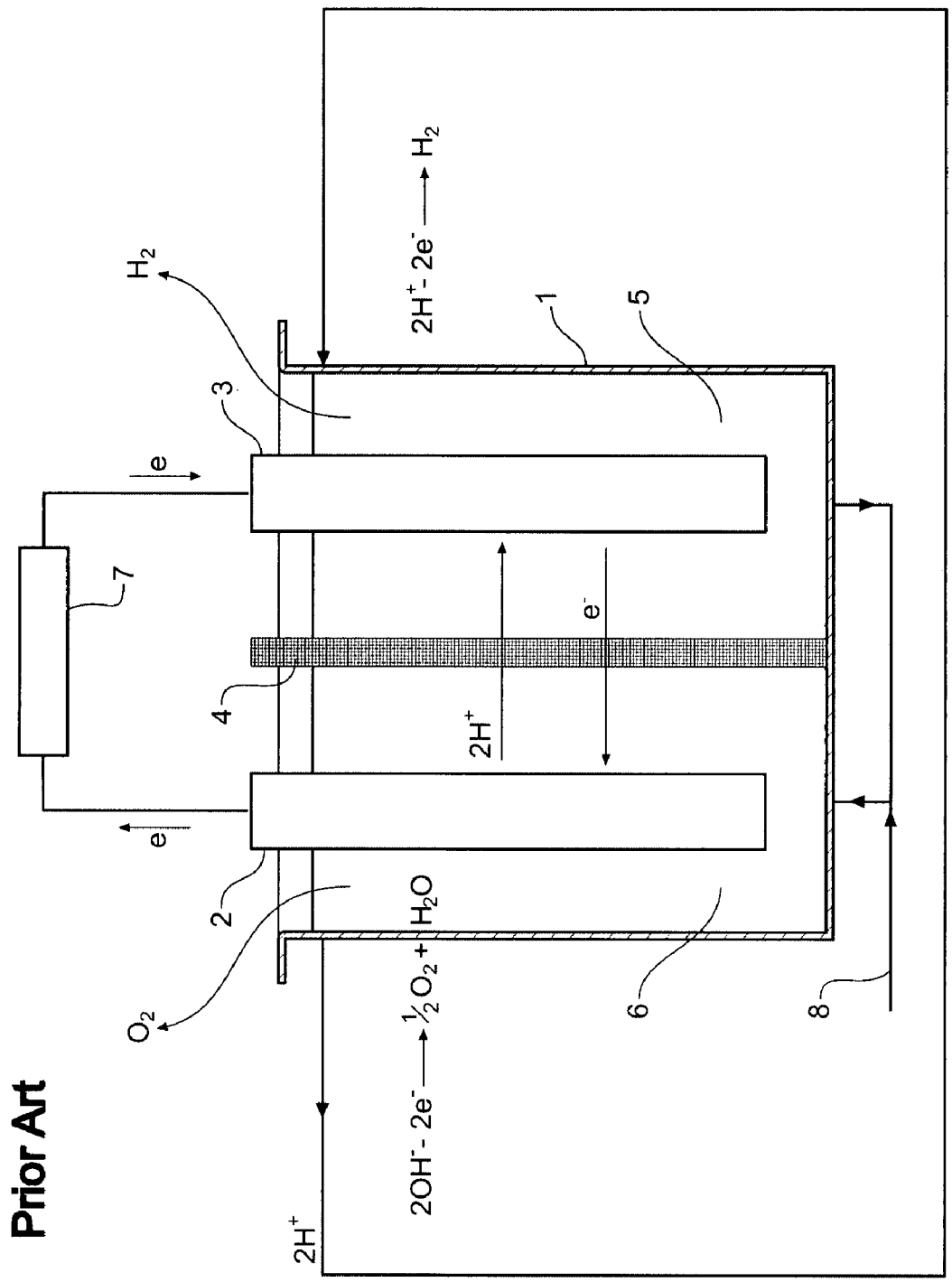
FIG. 1 shows a prior art diaphragm cell.

FIG. 1: The Conventional Diaphragm Cell in Water Electrolysis

The prior art diaphragm cell shown in FIG. 1 for water electrolysis consists of the cell 1, the anode electrode 2 and the cathode electrode 3 connected to the DC power source 7. The anode and cathode electrodes are separated by a diaphragm 4. In operation, the hydroxyl ions are converted to oxygen 10 and water. The excess of hydrogen ions is the driving force for the hydrogen ions to diffuse through the diaphragm 4 through the catholyte 5 to the cathode electrode 3 where the hydrogen ions are reduced to hydrogen gas 9.

The electronic circuit is from the DC power source to the cathode electrode through the catholyte through the diaphragm through the anolyte to the anode electrode and to the DC power source. The ionic circuit is normally from the anode through the anolyte through the diaphragm through the catholyte to the cathode electrode. This slow diffusion process can be by-passed by mechanically transferring the anolyte to the cathode cell. The reduced catholyte is returned 8a to the anode cell. Water 8 is added to the anode cell to replenish the water used in the reaction.

Figure 2:
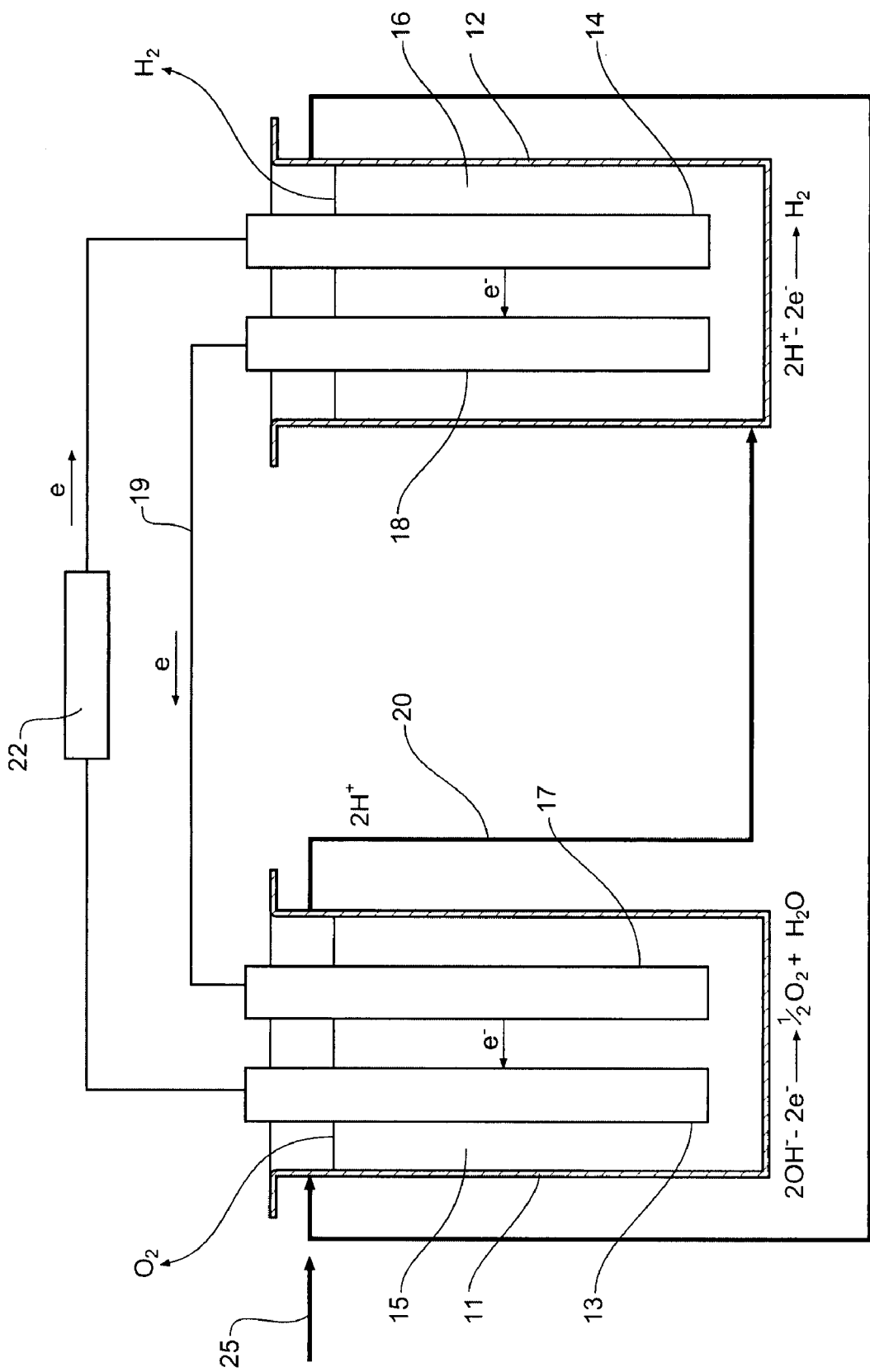
FIG. 2 shows schematically the principle of operation of a electrolytic cell according to one embodiment of the invention.

FIG. 2: Principle of the Electrolytic Cell of the Present Invention in Water Electrolysis The electrolytic cell consists of the anode cell 11 and the cathode cell 12. The diaphragm is replaced by a solution electrode 17 adjacent to the anode electrode 13 and solution electrode 18 adjacent to the cathode electrode 14 and externally connected by a conductor 19. In operation and using a potassium hydroxide solution 21, electrons are removed from the anolyte 15 in contact with the anode electrode 13 resulting in the following reaction:

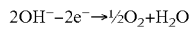
$2OH^- - 2e^- \rightarrow \frac{1}{2}O_2 + H_2O$ with the production of oxygen. The anolyte 20 containing the hydrogen ion is transferred to the cathode cell where electrons are added to the catholyte resulting in the following reaction:

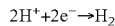
$2H^+ + 2e^- \rightarrow H_2$

The electronic circuit is from the DC power source 22 to the cathode electrode 14 through the catholyte 16 to the solution electrode 18 through the external conductor 19 to the solution electrode 17 at the anode cell 11 to through the anolyte 15 to the anode electrode 13 then to the DC power source 22. The ionic circuit consists of transferring the anolyte 15 via line 20 to the cathode cell 12 and returning the reduced catholyte 16 via line 21 to the anode cell 11. Water 25 is added to the anode cell 11 to make up for the water consumed in the reaction.

Figure 3:
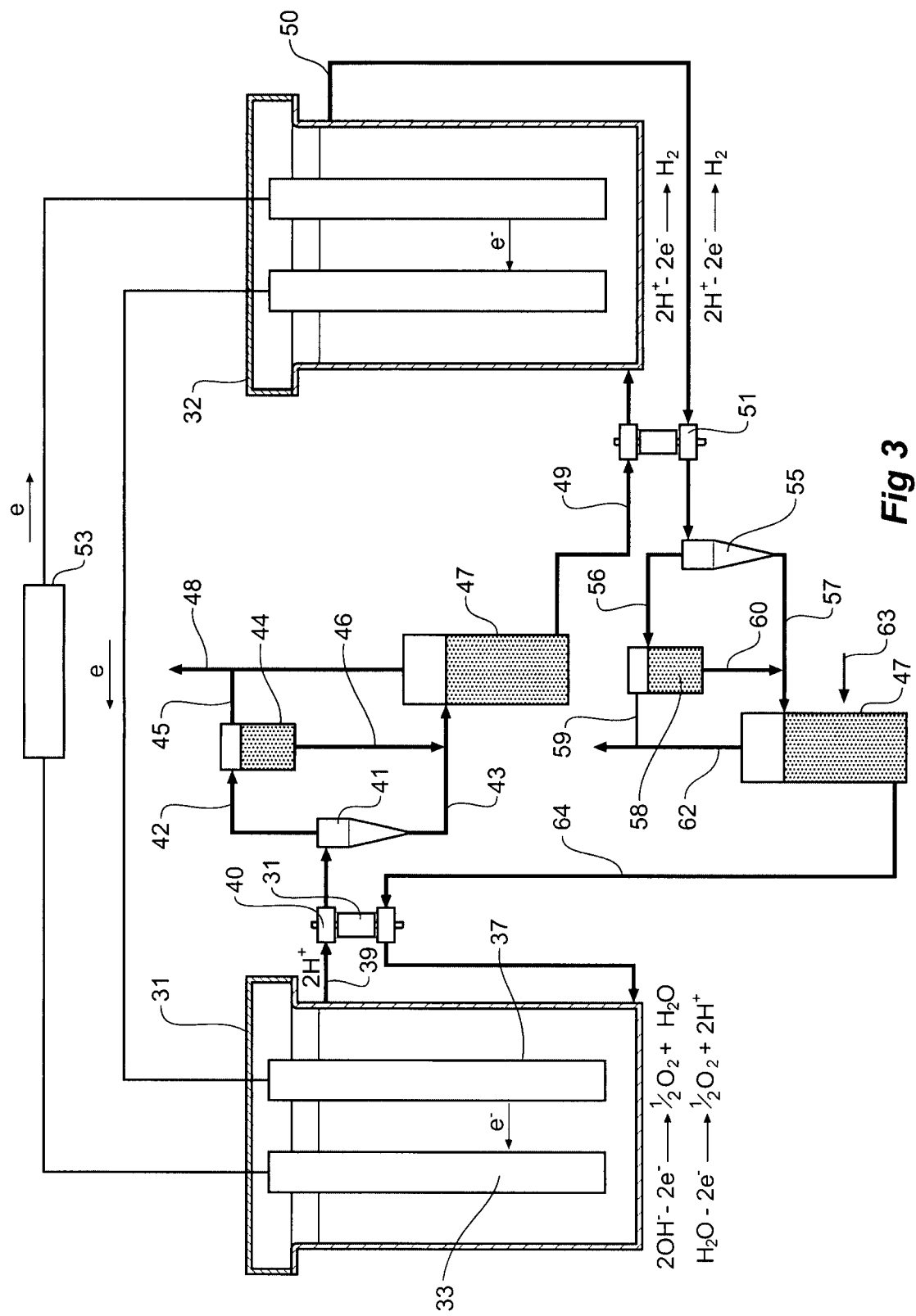
FIG. 3 shows a schematic commercial hydrogen production apparatus of the type shown in FIG. 2.

FIG. 3:

FIG. 3 is a schematic presentation of a commercial plant using diaphragm-less electrolytic cell to produce hydrogen from water using either an acid electrolyte or a basic electrolyte. The pressurized anode cell 31 containing the anode electrode 33 and the solution electrode 37 receives reduced catholyte 64 continuously and discharges the anolyte 39 continuously to a turbine pump 40. Electrons are continuously removed from the anolyte by the anode electrode 33 connected to the DC Power Source 53. The following reactions occur:

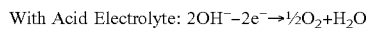
With Acid Electrolyte: $2OH^- - 2e^- \rightarrow \frac{1}{2}O_2 + H_2O$

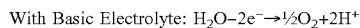
With Basic Electrolyte: $H_2O - 2e^- \rightarrow \frac{1}{2}O_2 + 2H^+$ The anolyte containing oxygen and the hydrogen ion is fed into a hydrocyclone 41 or centrifugal separator to remove as much oxygen in the electrolyte to the overflow 42. The separator 44 separates the liquid from the hydrocyclone overflow to produce the main oxygen stream 45 and electrolyte 46 that joins the hydrocyclone underflow 43 and directed into the cathode pump box 47. The oxygen may either be released to the atmosphere 48 to maintain the oxygen balance or collected and used as oxidant in fuel cell installations. The anolyte 49 with out oxygen and containing the hydrogen ions is transferred under pressure by turbine pump 51 where the following reactions occur:

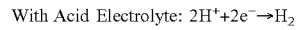
With Acid Electrolyte: $2H^+ + 2e^- \rightarrow H_2$

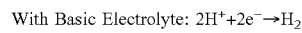
With Basic Electrolyte: $2H^+ + 2e^- \rightarrow H_2$

The turbine pumps 31 and 51 are used to reduce power consumption in the commercial process. The catholyte 50 containing the hydrogen gas is passed through the turbine pump 51 to the hydrocyclone 55 where the hydrogen gas is separated into the overflow 56 that is directed to separator 58. The catholyte liquids 57 and 60 are collected into the anode pump box 61 before being pumped by turbine pump 31 to the anode cell 31. Water 63 is added to the anode pump box 61 to replenish the water used in the reaction.

In either acid or basic electrolytes, appropriate metal or compound ions may be used to further reduce the voltage of the cell. The example given in FIG. 3 is the ferrous-ferric ion and the reaction at the anode with an acid electrolyte is projected as follows:

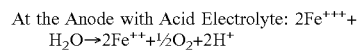
At the Anode with Acid Electrolyte: $2Fe^{+++} + H_2O \rightarrow 2Fe^{++} + \frac{1}{2}O_2 + 2H^+$

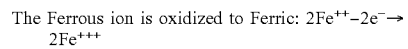
The Ferrous ion is oxidized to Ferric: $2Fe^{++} - 2e^- \rightarrow 2Fe^{+++}$ The objective of this commercial process is to produce the quantities of hydrogen shown on Table 1.

FIG. 4

Figure 4:
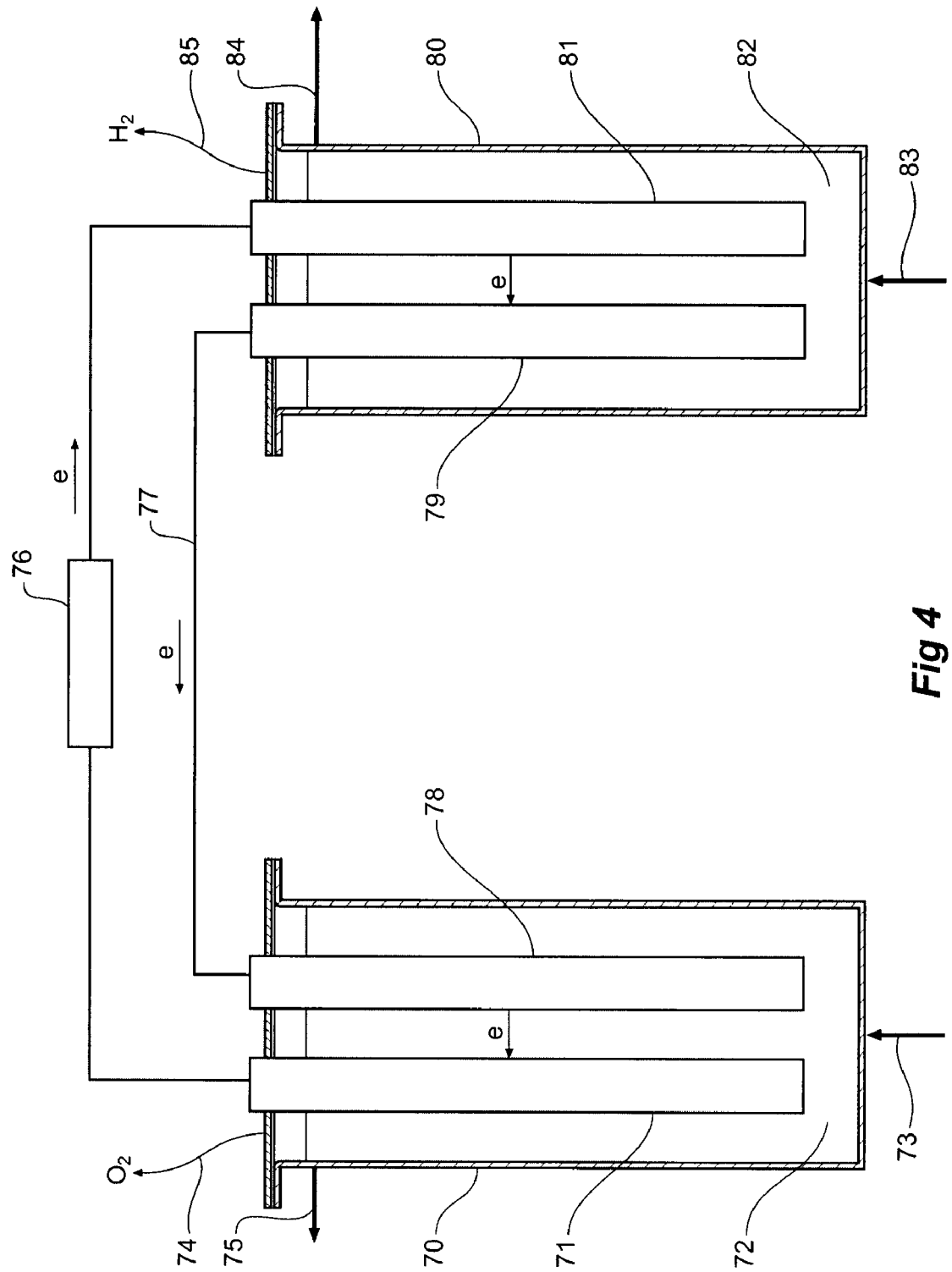
FIG. 4 shows schematically the principle of operation of a electrolytic cell according to an alternative embodiment of the invention using unipolar activation.

FIG. 4 is an embodiment of the diaphragm-less electrolytic cell of the present invention in a unipolar mode where there are separate anode and cathode circuits. There is a separate electrolyte passing the anode cell and a separate electrolyte passing the cathode cell. These electrolytes are connected electrically to the DC power source and through the solution electrodes. Electrons are removed from the anode electrolyte while electrons are added to the electrolyte passing the cathode cell.

Water 73 is fed into the anode cell 70 containing the anode electrode 71 and the solution electrode 78. The oxidized electrolyte is discharged from the anode cell 70 as anolyte 75. Gas 74 may be produced. Electrons are removed from the anode electrolyte by the DC power source 76 and delivered to the cathode electrode 81 at the cathode cell 80. Water 83 is fed into the cathode cell 80 and is discharged as catholyte 84 after being reduced. There hydrogen gas 85 is generated. The electronic circuit is from the DC power source 76 to the cathode electrode 81 through the catholyte 82 to the solution electrode 79 to the external conductor 77 to the solution electrode 78 through the anolyte 72 to the anode electrode 71 and to the DC power source 76.

FIG. 5

Figure 5:
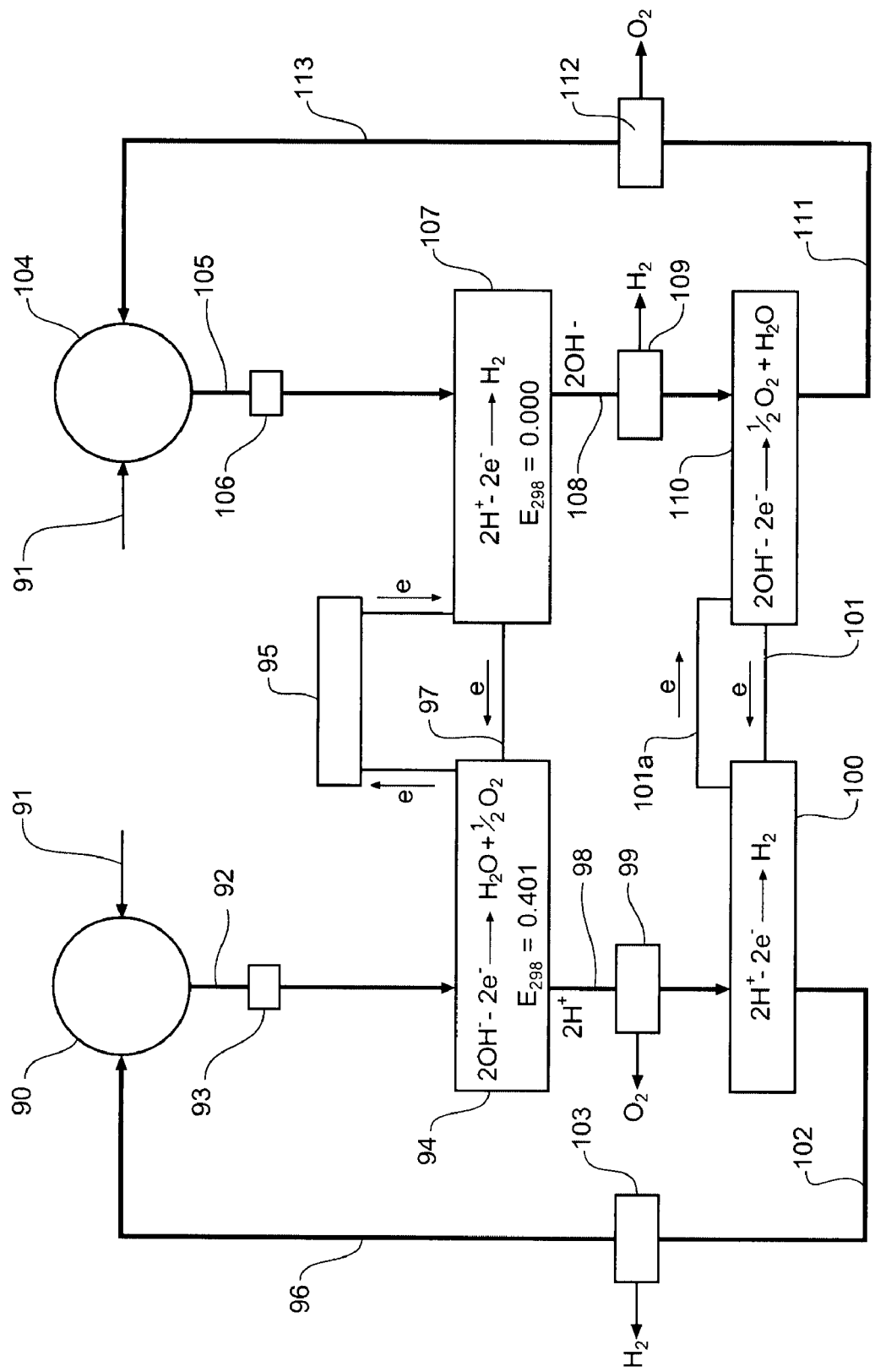
FIG. 5 shows a schematic hydrogen production apparatus of the type shown in FIG. 4 but including secondary cells.

The concept shown on FIG. 5 to reduce energy consumption in water electrolysis was developed from tests carried out in our laboratory. The concept has the objective of reducing the energy consumption in the electrolysis of water by reducing the voltage required and utilizing the energy imparted to the electrolytes in the primary cells to produce more hydrogen.

The alkaline circuit consists of a storage tank 90 where electrolyte 92 and water 91 are withdrawn by pump 93 and fed to primary anode cell 94 that is connected to DC power source 95. The primary anode cells solution electrodes are connected by external conductor 97 to the primary cathode solution electrodes. Oxygen is produced at a theoretical voltage of 0.401 volts. The oxidized electrolyte 98 rich in hydrogen ion is passed to an oxygen collector 99 before passing through the secondary cathode cells 100 where the oxidized electrolyte is reduced. Theoretically, a voltage of 0.828 is required to produce hydrogen. Several secondary cathode cells may be connected in series to achieve the required voltage to produce hydrogen. The reduced electrolyte 102 is passed to hydrogen collector 103 before the electrolyte 96 is returned to the alkaline storage tank 90.

The acid circuit consists of a storage tank 104 where electrolyte 105 and water 91 are withdrawn by pump 106 and fed to primary cathode cells 107 that is connected to DC power source 95. The primary cathode cells solution electrodes are connected by external conductor 97 to the primary anode solution electrodes. Hydrogen is produced at a theoretical voltage of 0.000 volts. The reduced electrolyte 108 rich in hydroxyl ion is passed to a hydrogen collector 109 before passing through the secondary anode cells 110 where the reduced electrolyte is oxidized. Theoretically, a voltage of 1.229 volts is required to produce oxygen. Several secondary anode cells may be connected in series to achieve the required voltage to produce oxygen. The oxidized electrolyte 111 is passed to an oxygen collector 112 before the electrolyte 113 is returned to the acid storage tank 104. The secondary cathode cell solution electrodes are connected by external conductor 101 to the secondary anode solution electrodes and the secondary cathodes are connected by external conductor 101a to the secondary anodes.

FIG. 6

Figure 6:
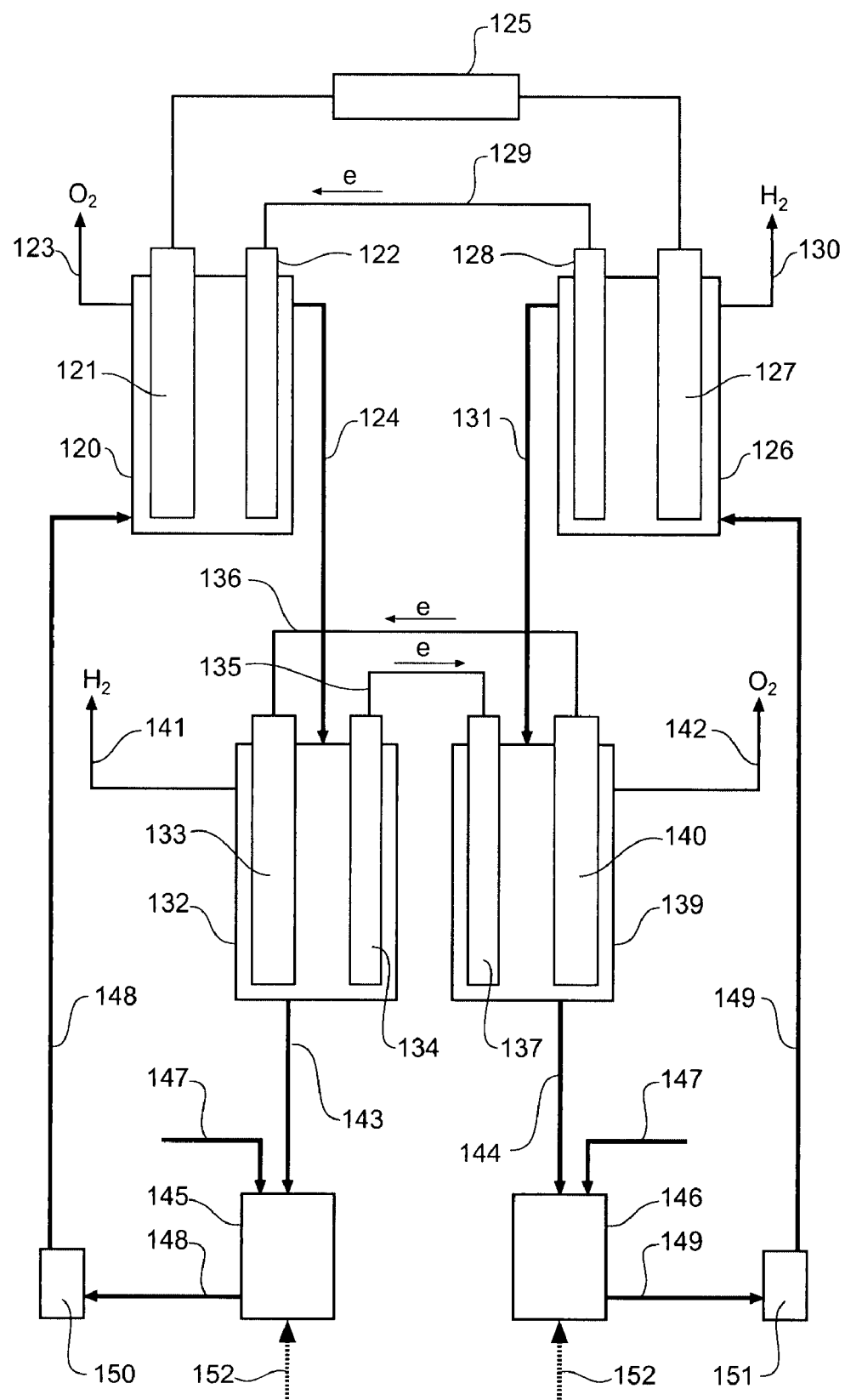
FIG. 6 shows a schematic commercial hydrogen production apparatus of the type shown in FIG. 5.

FIG. 6 is a diagram of a commercial process to produce hydrogen by unipolar activation using potassium hydroxide electrolyte in one circuit and phosphoric acid in the other circuit.

The potassium hydroxide circuit consists of a storage tank 145 provided with heat 152 and make up water 147 controlled by a float valve. Electrolyte 148 is withdrawn by pump 150 and the electrolyte 148 is delivered to the primary anode cells 120 containing the anode electrodes 121 connected to the DC power source 125 and the solution electrodes 122 connected to the external conductor 129. Oxygen 123 is produced by the reaction:

$6OH^- - 6e^- \rightarrow \frac{3}{2}O_2 + 3H_2O$

The oxidized electrolyte 124 exiting the primary anode cell 120 is rich in potassium ions and is passed to the secondary cathode cells 132 containing the secondary cathode electrodes 133 connected by external conductor 136 to the secondary anode electrodes 140 and containing the secondary cathode solution electrodes 134 connected by external conductor 135 to the secondary anode solution electrodes 137. The theoretical voltage to produce hydrogen is 0.828 volts from the following reaction:

$6K^+ + 6OH^- + 6H^+ + 6e^- \rightarrow 6KOH + 3H_2$

It may require several secondary cathode cells connected in series to generate the hydrogen. The electrolyte 143 is returned to the storage tank 145.

The phosphoric acid circuit consists of a storage tank 146 provided with heat 152 and make up water 147 controlled by a float valve. Electrolyte 149 is withdrawn by pump 151 and the electrolyte 149 is delivered to the primary cathode cells 126 containing the cathode electrodes 127 connected to the DC power source 125 and the solution electrodes 128 connected to the external conductor 129. Hydrogen 130 is produced by the reaction:

$6H^+ + 6e^- \rightarrow 3H_2$

The reduced electrolyte 131 exiting the primary cathode cell 126 is rich in phosphoric ions and is passed to the secondary anode cells 139 containing the secondary anode electrodes 140 connected by external conductor 136 to the secondary cathode electrodes 133 and containing the secondary anode solution electrodes 137 connected by external conductor 135 to the secondary cathode solution electrodes 134. The theoretical voltage to produce oxygen is 1.229 volts from the following reaction:

$2PO_4^- + 6H^+ + 6OH^- - 6e^- \rightarrow H_3PO_4 + 3H_2O + \frac{3}{2}O_2$

It may require several secondary anode cells connected in series to generate the oxygen. The electrolyte 144 is returned to the storage tank 146.

TABLE 1

Preliminary Projected Hydrogen Production Rate of Electrolytic Process of the Present Invention

| Assumptions: | |
| --- | --- |
| Ratio of Electrode Depth to Width | 1.25 |
| Current Efficiency, percent | 98 |
| Current Density, amperes per square meter | 500 |
| Theoretical Cell Voltage, volts | 1.229 |
| Ratio of Actual Electrolysis Voltage to theoretical | 1.15 |
| One watt-hour = Joules | 3601 |
| One (1) Std Cubic meter of Hydrogen = moles | 44.64286 |
| One Gram Mole of Hydrogen Requires | 96,485 |
| Efficiency loss to Pumps and heating, percent | 90 |
| One Gram Mole of Hydrogen ($H_2$) = liters at STP | 22.4 |
| Theoretical KWH/normal Cubic meter of hydrogen, kwh | 2.69 |
| Energy Efficiency of Electrolytic Cell, % | 76.71 |
| Energy Efficiency of Electrolytic Cell, % | 85.23 |
| Energy Efficiency of Knowles Cell (4.14 kwh/Nm3), % | 65.09 |
| Energy Efficiency of Stuart Cell (4.9 kwh/Nm3), % | 54.99 |
| Output of Knowles Cell, normal cubic meters of hydrogen per hr | 2.06 |
| Output of Stuart Cell, normal cubic meters of hydrogen per hour | 2.4 |
| Gram moles of $H_2$ Used by 75 Kw Fuel Cell Car per hour | 1,115.92 |
| Gram moles of $H_2$ used by 250 kw Fuel Cell Bus per hour | 3,719.73 |

| Net Power for Electrolysis Kilowatts | Gross Power Electrolysis Kilowatts | Effective Current thru Cell | Gram Mols of $H_2$ prod. per day | Std. Meter3 of $H_2$ prod. per day | Normal $m^3$ of $H_2$ per hour | Energy Eff. KWH per N $m^3$ |
| --- | --- | --- | --- | --- | --- | --- |
| 3 | 3.4 | 2123 | 1901 | 21 | 0.97 | 3.51 |
| 5 | 5.7 | 3538 | 3168 | 35 | 1.61 | 3.51 |
| 25 | 28.3 | 17688 | 15840 | 177 | 8.07 | 3.51 |

TABLE 1-continued

Preliminary Projected Hydrogen Production Rate of Electrolytic Process of the Present Invention

| 50 | 56.7 | 35377 | 31679 | 355 | 16.14 | 3.51 |
| 75 | 85.0 | 53065 | 47519 | 532 | 24.21 | 3.51 |
| 100 | 113.4 | 70754 | 63358 | 710 | 32.27 | 3.51 |
| 250 | 283.4 | 176885 | 158396 | 1774 | 80.69 | 3.51 |
| 500 | 566.9 | 353769 | 316792 | 3548 | 161.37 | 3.51 |
| 1000 | 1133.8 | 707539 | 633584 | 7096 | 322.75 | 3.51 |
| 10000 | 11337.9 | 7075388 | 6335840 | 70961 | 3227.49 | 3.51 |
| 100000 | 113378.7 | 70753883 | 63358402 | 709614 | 32274.88 | 3.51 |

For 113,379 kw off-peak power, hydrogen produced for 12 hours, gram moles   31,679,201

Results:

For 113,379 KW off-peak power for 12 hrs generating

| Hydrogen Fuel for the Following Transport Vehicles: | |
|---|---|
| No. of buses running 22 hrs at 75% Efficiency and 80% Operating efficiency | 363 |
| No. of buses running 22 hrs at 56% Efficiency and 80% Operating Efficiency | 271 |
| No. of cars running 5 hrs at 75% Efficiency and 100% Operating Efficiency | 4,258 |
| No. of cars running 5 hrs at 56% Efficiency and 100% Operating Efficiency | 3,180 |
| When comparing fuel cell bus and existing diesel bus, include: | |

1. Mileage of diesel bus versus fuel cell bus for same amount of fuel.
2. Maintenance cost of diesel bus versus fuel cell bus.

TABLE 2

Projected Commercial Sizes of Electrolytic Cells of the Present Invention

Assumptions:

| | | |
|---|---|---|
| Ratio of Electrode Depth to Width | 1.25 | |
| Current Efficiency, percent | 98 | |
| Current Density, amperes per square meter | 500 | |
| Theoretical Cell Voltage, volts | 1.229 | |
| Ratio of Actual Electrolysis Voltage to theoretical | 1.15 | |
| One watt-hour = Joules | 3601 | |
| One (1) Std Cubic meter of Hydrogen = moles | 44.64286 | |
| One Gram Mole of Hydrogen Requires | 96,485 | Coulombs or ampere seconds |
| Efficiency loss to Pumps and heating, percent | 90 | |
| One Gram Mole of Hydrogen ($H_2$) = liters at STP | 22.4 | |
| Theoretical KWH/normal Cubic meter of hydrogen, kwh | 2.69 | |
| Energy Efficiency of Electrolytic Cell, % | 76.71 | Includes energy for heating and pumping. |
| Energy Efficiency of Electrolytic Cell, % | 86.97 | Excludes energy for heating and pumping. |
| Energy Efficiency of Knowles Cell (4.14 kwh/$Nm^3$), % | 65.09 | Excludes energy for heating and pumping. |
| Energy Efficiency of Stuart Cell (4.9 kwh/$Nm^3$), % | 54.99 | Excludes energy for heating and pumping. |
| Output of Knowles Cell, normal cubic meters of hydrogen per hour | 2.06 | |
| Output of Stuart Cell, normal cubic meters of hydrogen per hour | 2.4 | |

| Net Power for Electrolysis (Kw) | Gross Power Electrolysis (Kw) | Effective Current thru Cell (A) | Gram Mols of $H_2$ prod. per day | Std. $M^3$ of $H_2$ prod. per day | Normal $M^3$ of $H_2$ per hour | Energy Eff. KWH per N $M^3$ | Total Area of Electrode active $M^2$ | No. of Electrodes | Area per Electrode $M^2$ | Width M | Depth M | Resulting Area $M^2$ |
|---|---|---|---|---|---|---|---|---|---|---|---|---|
| 3 | 3.4 | 2123 | 1901 | 21 | 0.97 | 3.51 | 4.25 | 2 | 1.06 | 0.92 | 1.15 | 1.06 |
| 5 | 5.7 | 3538 | 3168 | 35 | 1.61 | 3.51 | 7.08 | 4 | 0.88 | 0.84 | 1.05 | 0.88 |
| 25 | 28.3 | 17688 | 15840 | 177 | 8.07 | 3.51 | 35.38 | 10 | 1.77 | 1.19 | 1.49 | 1.77 |
| 50 | 56.7 | 35377 | 31679 | 355 | 16.14 | 3.51 | 70.75 | 10 | 3.54 | 1.684 | 2.11 | 3.54 |

TABLE 2-continued

Projected Commercial Sizes of Electrolytic Cells of the Present Invention

| | | | | | | | | | | | | |
|---|---|---|---|---|---|---|---|---|---|---|---|---|
| 75 | 85.0 | 53065 | 47519 | 532 | 24.21 | 3.51 | 106.13 | 10 | 5.31 | 1.684 | 2.11 | 3.54 |
| 100 | 113.4 | 70754 | 63358 | 710 | 32.27 | 3.51 | 141.51 | 20 | 3.54 | 1.684 | 2.11 | 3.54 |
| 250 | 283.4 | 176885 | 158396 | 1774 | 80.69 | 3.51 | 353.77 | 25 | 7.08 | 2.38 | 2.98 | 7.08 |
| 500 | 566.9 | 353769 | 316792 | 3548 | 161.37 | 3.51 | 707.54 | 50 | 7.08 | 2.38 | 2.98 | 7.08 |
| 1000 | 1133.8 | 707539 | 633584 | 7096 | 322.75 | 3.51 | 1415 | 100 | 7.08 | 2.38 | 2.98 | 7.08 |
| 10000 | 11337 | 7075388 | 6335840 | 70961 | 3227.49 | 3.51 | 14150 | 715 | 9.90 | 2.814 | 3.52 | 9.90 |
| 100000 | 113378 | 70753883 | 63358402 | 709614 | 32274.88 | 3.51 | 141507 | 7150 | 9.90 | 2.814 | 3.52 | 9.90 |

The invention claimed is:

1. An electrolytic process to produce hydrogen from water, the process comprising the steps of;
   passing a first electrolyte through a diaphragm-less anode cell to produce oxygen wherein the anode cell has an anode and an anode solution electrode, the anode being connected to a DC power source;
   passing a second electrolyte through a diaphragm-less cathode cell to produce hydrogen wherein the cathode cell has a cathode and a cathode solution electrode, the cathode being connected to the DC power source;
   the anode solution electrode connected to the cathode solution electrode by an external conductor; and
   applying a DC current from the DC power source to the anode and the cathode.

2. A process as in claim 1 wherein the first electrolyte and the second electrolyte are the same electrolyte and the step of suppling the first electrolyte to the anode cell comprises supplying the second electrolyte and the step of suppling the second electrolyte to the anode cell comprises supplying the first electrolyte.

3. A process as in claim 2 further including the steps of separating hydrogen from the second electrolyte between the cathode cell and the anode cell and separating oxygen from the first electrolyte between the anode cell and the cathode cell.

4. A process as in claim 3 wherein the step of separating hydrogen and oxygen from the second and first electrolytes respectively comprises the steps of passing the respective electrolytes through an hydrocyclone and a gas liquid separator.

5. A process as in claim 1 wherein the electrolyte is water that is acidic or basic.

6. A process as in claim 5 wherein the water is added as water or as steam.

7. A process as in claim 1 wherein the DC current applied is at a steady rate or the current applied is pulsed.

8. A process as in claim 7 wherein the pulsed DC current has a frequency up to several thousand pulses per second and an amplitude up to 100 times the average value of the current.

9. A process as in claim 1 wherein the pressure in the anode and cathode cells is up to 100 bars.

10. A process as in claim 9 wherein regenerative pumps are used to minimise the energy required to maintain pressure in the anode and cathode cells.

11. A process as in claim 1 further including the step of applying microwaves to the electrolytes.

12. A process as in claim 1 wherein the anode cells and the cathode cells are operated at a temperature of up to 200 degrees Celsius.

13. A process as in claim 1 wherein catalyst ions are added to the electrolyte to reduce the voltage required to produce the hydrogen and increase the production rate of hydrogen.

14. A process as in claim 1 wherein the anode solution electrodes and the cathode solution electrodes are coated with a substance to increase the over-voltage of the undesired reactions of the catalyst ions.

15. A process as in claim 1 wherein the anode solution electrodes and the cathode solution electrodes are shrouded with a non-conductor mesh to retain a stagnant layer of electrolyte on the surface of the solution electrodes to avoid undesired reactions of the catalyst ions.

16. A process as in claim 1 wherein modifiers such as boric acid are added to the electrolyte to maintain a good quality and consistency of the electrolyte.

17. A process as in claim 1 wherein modifiers such as surfactants are added to the electrolyte to make the surface of the anode and cathode electrodes aerophobic to minimize the formation of gas bubbles on the electrode surfaces.

18. A process as in claim 1 wherein the electrode surface area is increased by grooving, by the use expanded metal sheets and creating pyramids on the electrode surface.

19. A process as in claim 1 wherein the anode and the cathode surfaces are coated with a substance to reduce the over-voltage of the desired reactions on these electrodes.

20. A process as in claim 1 wherein the first electrolyte is an alkaline electrolyte and the electrolytic process in the anode cell to produce oxygen is carried out in an anode circuit and the second electrolyte is an acidic electrolyte and the electrolytic process in the cathode cell to produce hydrogen is carried out in a cathode circuit and the anode circuit and the cathode circuit are kept separate except for the electrical connections.

21. A process as in claim 20 where the anode circuit further includes a secondary cathode cell and the cathode circuit further includes a secondary anode cell, the secondary anode cell having a secondary anode and a secondary anode solution electrode, the secondary cathode cell having a secondary cathode and a secondary cathode solution electrode, the secondary cathode and the secondary anode are connected by an external conductor, and the secondary cathode solution electrode and the secondary anode solution electrode are connected by an external conductor, the first electrolyte being passed from the anode cell to the secondary cathode cell to produce hydrogen therein before being recycled to the anode cell and the second electrolyte being passed from the cathode cell to the secondary anode cell to produce oxygen therein before being recycled to the cathode cell.

22. A process as in claim 21 further including the steps of separating oxygen from the first electrolyte before transferring it to the secondary cathode call and separating hydrogen after the secondary cathode cell before being recycled to the anode cell and separating hydrogen from the second electrolyte before transferring it to the secondary anode call and separating oxygen after the secondary anode cell before being recycled to the cathode cell.

23. An electrolytic apparatus to produce hydrogen from water, the apparatus comprising a diaphragm-less anode cell to produce oxygen wherein the anode cell has an anode and an anode solution electrode, the anode being connected to a DC power source, a diaphragm-less cathode cell to produce hydrogen wherein the cathode cell has a cathode and a cathode solution electrode, the cathode being connected to the DC power source, the anode solution electrode connected to the cathode solution electrode by an external conductor, means to supply a first electrolyte to the anode cell, means to supply a second electrolyte to the anode cell and means to apply a DC current from the DC power source to the anode and the cathode, wherein the first electrolyte and the second electrolyte are the same electrolyte and the means to supply the first electrolyte to the anode cell supplies the second electrolyte and the means to supply the second electrolyte to the anode cell supplies the first electrolyte and further including means to separate hydrogen from the second electrolyte between the cathode cell and the anode cell and means to separate oxygen from the first electrolyte between the anode cell and the cathode cell.

24. An electrolytic apparatus as in claim 23 wherein the means to separate hydrogen and oxygen from the second and first electrolytes respectively comprises an hydrocyclone and a gas liquid separator.

25. An electrolytic apparatus as in claim 23 wherein the electrolyte is water that is acidic or basic.

26. An electrolytic apparatus as in claim 23 wherein the means to apply a DC current from the DC power source the DC current is adapted to supply current at a steady rate or pulsed.

27. An electrolytic apparatus as in claim 23 wherein the means to supply the first and second electrolytes are regenerative pumps to minimise the energy required to maintain pressure in the anode and cathode cells.

28. An electrolytic apparatus as in claim 23 further including means to apply microwaves to the electrolytes.

29. An electrolytic apparatus as in claim 23 wherein the anode solution electrodes and the cathode solution electrodes are coated with a substance to increase the over-voltage of the undesired reactions of the catalyst ions.

30. An electrolytic apparatus as in claim 23 wherein the anode solution electrodes and the cathode solution electrodes are shrouded with a non-conductor mesh to retain a stagnant layer of electrolyte on the surface of the solution electrodes to avoid undesired reactions of the catalyst ions.

31. An electrolytic apparatus as in claim 23 wherein the cathode and anode surface area is increased by grooving, by the use expanded metal sheets and creating pyramids on the electrode surface.

32. An electrolytic apparatus as in claim 23 wherein the anode and the cathode surfaces are coated with a substance to reduce the over-voltage of the desired reactions on these electrodes.

33. An electrolytic apparatus to produce hydrogen from water, the apparatus comprising a diaphragm-less anode cell to produce oxygen wherein the anode cell has an anode and an anode solution electrode, the anode being connected to a DC power source, a diaphragm-less cathode cell to produce hydrogen wherein the cathode cell has a cathode and a cathode solution electrode, the cathode being connected to the DC power source, the anode solution electrode connected to the cathode solution electrode by an external conductor, means to supply a first electrolyte to the anode cell, means to supply a second electrolyte to the anode cell and means to apply a DC current from the DC power source to the anode and the cathode wherein the anode cell is in an anode circuit and the cathode cell is in a cathode circuit and the anode circuit and the cathode circuit are separate, the first electrolyte in the anode circuit comprising an alkaline electrolyte and the second electrolyte in the cathode circuit comprising an acidic electrolyte.

34. An electrolytic apparatus as in claim 33 where the anode circuit further includes a secondary cathode cell and the cathode circuit further includes a secondary anode cell, the secondary anode cell having a secondary anode and a secondary anode solution electrode, the secondary cathode cell having a secondary cathode and a secondary cathode solution electrode, the secondary cathode and the secondary anode are connected by an external conductor, and the secondary cathode solution electrode and the secondary anode solution electrode are connected by an external conductor, the first electrolyte being passed from the anode cell to the secondary cathode cell to produce hydrogen therein before being recycled to the anode cell and the second electrolyte being passed from the cathode cell to the secondary anode cell to produce oxygen therein before being recycled to the cathode cell.

35. An electrolytic apparatus as in claim 33 further comprising means to separate oxygen from the first electrolyte before transferring it to the secondary cathode call and means to separate hydrogen after the secondary cathode cell before being recycled to the anode cell and means to separate hydrogen from the second electrolyte before transferring it to the secondary anode call and means to separate oxygen after the secondary anode cell before being recycled to the cathode cell.

* * * * *